United States Patent [19]
Vassar

[11] Patent Number: 4,488,252
[45] Date of Patent: Dec. 11, 1984

[54] FLOATING POINT ADDITION ARCHITECTURE

[75] Inventor: Edward R. Vassar, Framingham, Mass.

[73] Assignee: Raytheon Company, Lexington, Mass.

[21] Appl. No.: 350,860

[22] Filed: Feb. 22, 1982

[51] Int. Cl.³ .............................................. G06F 7/50
[52] U.S. Cl. .................................................. 364/748
[58] Field of Search ............................ 364/748, 736

[56] References Cited
U.S. PATENT DOCUMENTS

| | | | |
|---|---|---|---|
| 4,308,589 | 12/1981 | Joyce et al. | 364/748 |
| 4,338,675 | 7/1982 | Palmer et al. | 364/748 |
| 4,405,992 | 9/1983 | Blau et al. | 364/748 |

OTHER PUBLICATIONS

Smith et al., "Fixed-Point, Floating-Point Adder", *Technical Notes* RCA Aug. 20, 1969 pp. 1-3.
Covert et al., "Floating-Point Adder Chip Fills Digital-Processing Gap", *Electronic Design* Nov. 26, 1981 pp. 187-192.

*Primary Examiner*—David H. Malzahn
*Attorney, Agent, or Firm*—Walter F. Dawson; Richard M. Sharkansky; Joseph D. Pannone

[57] ABSTRACT

Parallel shifter architecture in an arithmetic unit of a digital computer for processing floating point mantissas. An arithmetic-logic unit (ALU) in series with shifting means functions in parallel with a barrel shifter. Both paths are executed simultaneously and the output of one path is selected for storage at the end of a microcycle based on machine status and the actual floating point numbers manipulated. This architecture provides a significant reduction in floating point addition execution time.

63 Claims, 5 Drawing Figures

FLOATING POINT ADDITION ARCHITECTURE

The Government has rights in this invention pursuant to Contract No. DA5G60-81-C-0038 awarded by the Department of the Army.

BACKGROUND OF THE INVENTION

This invention relates to the arithmetic unit of a digital computer and more particularly to apparatus for providing a significant reduction in floating point addition execution time by reducing the time required for performing shifting operations.

The arithmetic operations performed in digital computers may be fixed-point arithmetic commonly used for business data or statistical calculations or floating point arithmetic used mainly for scientific and engineering computations. In a digital computer design, the radix point is implied and does not occupy a physical location in a storage device. With fixed-point arithmetic, a radix point is located immediately to the right of the least significant digit place or located immediately to the right of the sign place before the first digit place. With floating-point arithmetic, a number is represented by a sign, a mantissa and an exponent where the mantissa may assume a fixed point notation and the exponent may be either a positive or negative integer.

One has to compare and equalize the exponents of two floating point numbers before they can be added or subtracted. Often a separate arithmetic unit is provided for handling exponent calculations concurrently with mantissa calculations in order to improve the speed of operation. In normalized floating point arithmetic operations, a floating point number is normalized if the most significant digit place of a mantissa contains a nonzero digit. Normalizing requires shifting the mantissa to the left which pushes off redundant leading zeros in the more significant digit places and the exponent is decreased accordingly until a nonzero appears in the most significant place. In normalized arithmetic, all the floating point numbers must be prenormalized before they can be manipulated. Therefore, after every intermediate computation step, renormalization procedures must be performed to ensure the integrity of the normalized form. Floating point number representations are described in many texts, one of which is "Computer Arithmetic: Principles, Architecture and Design", Kai Hwang, John Wiley and Sons, 1979.

Floating point addition requires shifting for operand alignment and result normalization. The number of shifts or shift count performed is limited only by the mantissa length and a particular rounding algorithm utilized. The maximum number of shifts performed in a binary number system is frequently equal to the number of mantissa bits plus one.

Computers comprising shifters limited to a shift count of a few bits at a time expend large amounts of time performing long shifting operations repetitively. Shifters with greater shifting range can accomplish an alignment or normalization shift in a single operation and generally exhibit substantially greater propagation delay than a single pass through a smaller shifter. In the prior art, floating point addition has been implemented in a manner whereby alignment and normalization are executed by one pass for each operation through a multiple digit shifter or by as many passes as required through a short shifter to accomplish a plurality of shifts.

SUMMARY OF THE INVENTION

This invention discloses an arithmetic unit for performing an addition operation with a significantly reduced execution time on the mantissa part of floating point numbers. Shifters are required to perform alignment and normalization functions during a floating point addition whereby a digital word passes through the shifter only once to accomplish each of the functions. The shifters comprise single digit shifters for shifting the digits within a digital word one place and a multiple digit shifter for shifting digits within a digital word a plurality of places. The multiple digit shifter has left and right shift capability and a single digit shifter requires only left or right shift capability, but not both. The multiple digit shifter comprises a barrel shifter and is traversed by a digital word no more than one time during a floating point addition operation. An arithmetic-logic unit is connected in parallel with the multiple digit shifter and single digit shifters are connected at the input and output of the arithmetic-logic unit; however, a digital word is not required to pass through the arithmetic-logic unit solely to gain access to a shifter. The performance of a floating point addition operation is under microprogram control. This configuration of shifters coupled to an arithmetic-logic unit provides the means for decreasing the execution time of a floating point addition operation.

The invention further discloses a digital computer comprising a memory for storing digital words including data and instructions, a main arithmetic unit and an exponent arithmetic unit for performing arithmetic and logic functions, control for generating signals to perform computer operations, an input-output unit for controlling the passage of digital words in and out of the computer, a computer bus for interconnecting the memory, arithmetic units and input and output unit, and an input-output bus for transferring digital words to and from the computer. The main arithmetic unit further includes two types of shifters for performing a floating point addition operation comprising an alignment and normalization function wherein a digital word passes through the shifters only once to accomplish each of said functions. The shifters comprise single digit shifters requiring left or right shift capability, but not both and a multiple digit shifter having left and right shift capability. The multiple digit shifter further comprises a barrel shifter and is traversed by a digital word no more than one time during a floating point addition operation. An arithmetic-logic unit is connected in parallel with the multiple digit shifter and single digit shifters are connected at the input and output of the arithmetic-logic unit; however, a digital word is not required to pass through the arithmetic-logic unit solely to gain access to a shifter. The performance of all computer operations is under microprogram control. This configuration of shifters coupled to an arithmetic-logic unit provides the means for decreasing the execution time of a floating point addition operation.

The invention further discloses the method of performing a floating point addition operation comprising the steps of performing alignment and normalization functions with shifters wherein a digital word passes through a shifter only once to accomplish each of said functions, shifting digits within said digital word one place using a single digit shifter, shifting digits within said digital word a plurality of places using a multiple digit shifter coupled to a single digit shifter wherein the multiple digit shifter is traversed by said digital word no more than one time during a floating point addition operation and performing an add function using an arithmetic-logic unit coupled to the shifters whereby said digital word is not required to pass through the arithmetic-logic unit solely to gain access to a shifter. The steps of shifting digits includes left and right shifts within said digital word and the step of performing an add function comprises the adding of two mantissa digital words. The step of shifting digits within a digital word a plurality of places comprises a barrel shifter. This method further includes the step of generating control signals using microprogram control wherein control signals simultaneously enable parallel paths with a multiple digit shifter in one path and an arithmetic-logic unit in another path and the control signals select for storage the output from only one of the paths as determined by machine status conditions.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
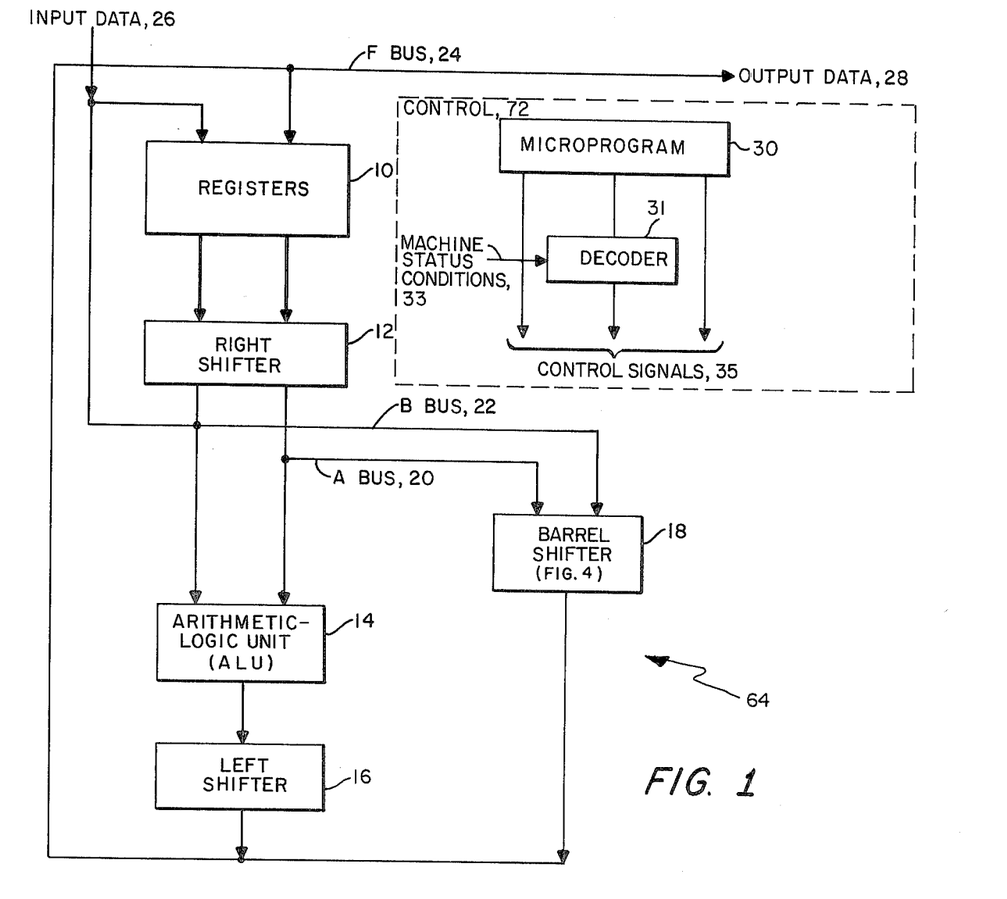
FIG. 1 is a functional block diagram of the invention.
Figure 2:
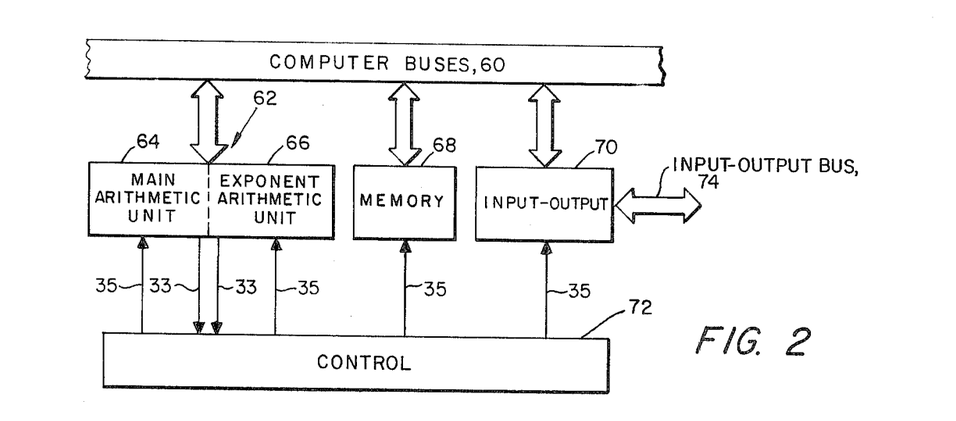
FIG. 2 is a general block diagram of a digital computer showing a main arithmetic unit utilizing floating point architecture in accordance with the invention.

Referring to FIG. 1, there is shown a functional block diagram of a main arithmetic unit 64 for performing arithmetic operations on a mantissa part of a floating point number or digital word. It is used in conjunction with a conventional floating point exponent arithmetic unit 66 as shown in FIG. 2 and appropriate control signals 35 to perform floating point arithmetic. A radix number system where the radix value, r, is equal to two is commonly known as the binary number system. A digit in the binary number system is referred to as a bit and in number systems having higher radix values for r, more binary digits or bits are required to encode each radix r digit. A digital word comprises a plurality of digits aligned in adjacent places to form a numerical representation. Registers 10 store the mantissas of floating point digital words or numbers to be added. A right shifter 12 provides a single digit right shift, as required, to digital words comprising one or more digits transferred from the registers 10. An arithmetic-logic unit (ALU) 14 performs the addition of two digital words or numbers representing mantissas provided to its inputs, performs logical operations on said digital words or simply transmits digital words unmodified to a single digit left shifter 16. Barrel shifter 18 which is in parallel with the path containing ALU 14 connected to left shifter 16 provides an arbitrary multiple digit left or right shift capability. A Bus 20, B Bus 22 and F Bus 24 facilitate the transfer of digital words during a floating point arithmetic operation. The A Bus 20 provides a floating point operand to one input of ALU 14 or a digital word to the barrel shifter 18. The B Bus 22 provides a floating point operand to a second input of ALU 14, a digital word to barrel shifter 18 or transfers a digital word to registers 10. The F Bus 24 transmits the floating point arithmetic intermediate or final results to the registers 10 or to other parts of a floating point digital computer.

The sequence of operations performed in the main arithmetic unit 64 including mantissa calculations are determined by a microprogram control 30 connected to a decoder 31 which provides the control signals 35 required based in some instances on certain machine status conditions 33 existing during specific operations.

Referring now to FIG. 2, the main arithmetic unit 64 is shown in this general block diagram of a digital computer which in combination with an exponent arithmetic unit 66 forms an overall arithmetic unit 62 for performing fixed point and floating point arithmetic operations. A memory 68 provides storage capability for data and instructions. An input-output 70 unit controls the passage of digital words in and out of the digital computer over an input-output bus 74. Computer buses 60 interconnect the arithmetic unit 62, memory 68 and input-output 70 for the transfer of data and instructions. A control 72 unit includes microprogram control techniques using read-only memory and generates the control signals 35 for performing all operations within the digital computer.

Floating point addition operation in general requires the following functional steps: (1) exponent comparison and alignment, (2) add (3) normalization, (4) round and (5) renormalization. The exponent comparison of Step 1 may be performed in a main arithmetic unit but preferably is performed in a separate exponent arithmetic unit 66 as shown in FIG. 2 for speed improvement purposes. If the alignment requires a shift of more than one digit, then the normalization operations will require at most a one digit shift. The parallel shifter architecture, as shown in FIG. 1, places the ALU 14 in one path and the multiple digit shifting capability performed by the barrel shifter 18 in a second path. However, a single digit shifting capability is provided by right shifter 12 and included in the ALU 14 path is left shifter 16. This approach uses the barrel shifter 18 only when necessary and at most once per floating point addition operation either for normalization or alignment, but not both. All other required shifts are handled by the single digit shifters such as right shifter 12 and left shifter 16. The decision on whether to use barrel shifter 18 for alignment or normalization is based on whether these operations require more than one digit shifts. If alignment requires more than a one digit shift, barrel shifter 18 is used for alignment. If the alignment is a zero or one digit shift, a single digit shifter is used for alignment and the barrel shifter 18 is reserved for normalization if required. The parallel shifter architecture results in a substantial reduction in the execution time for performing a floating point addition by minimizing the time spent in shifting operations and by limiting the passes through a barrel shifter to one for accomplishing a functional step such as an alignment.

Table 1 summarizes three sequences each of which perform floating point addition depending on the actual members being operated on. One of the three sequences A, B, or C is performed during the execution of a floating point addition with the parallel shifter architecture. The sequence performed depends on the actual floating point numbers manipulated. However, it can be shown that sequences A and C occur substantially more frequently than sequence B.

Figure 3:
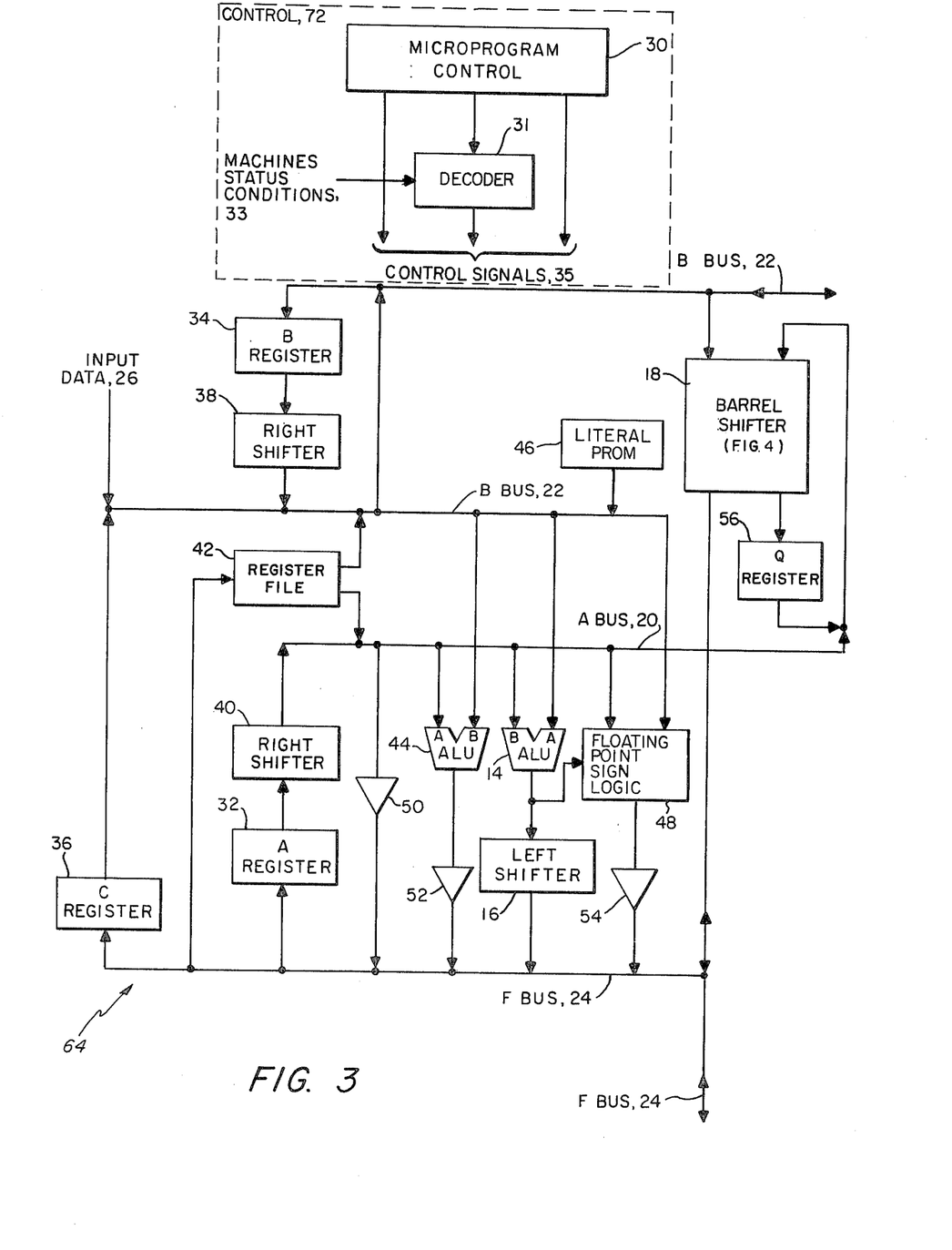
FIG. 3 illustrates a logical implementation of the invention shown in FIG. 1.
Figure 5:
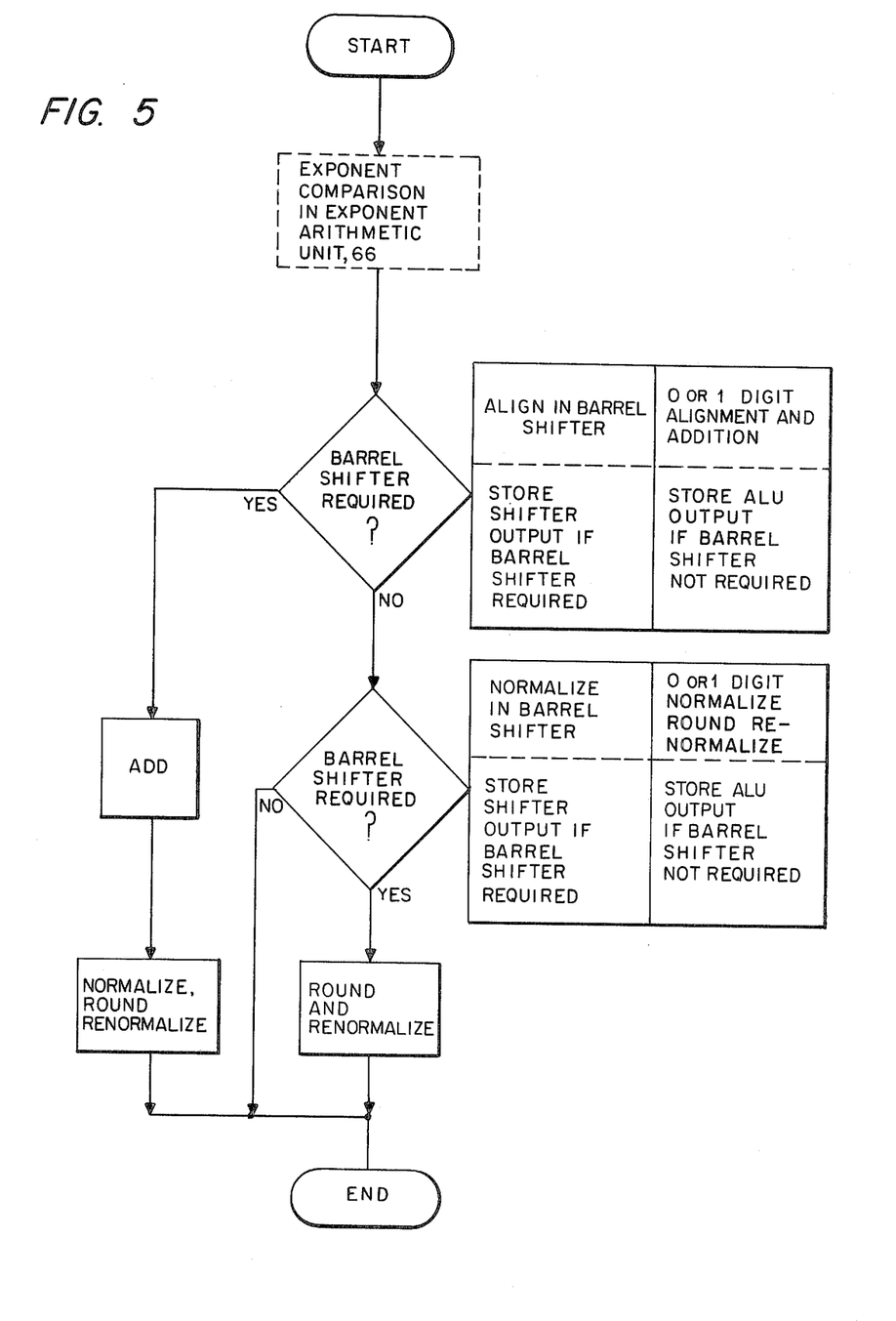
FIG. 5 is a microflow chart of a floating point addition operation as implemented by the invention.

FIG. 5 shows a microflow chart of a floating point addition operation as implemented by the invention of FIG. 1 and FIG. 3. The execution blocks drawn adjacent to the decision blocks are executed at the same time as the decision is made. Action which is conditional on status is noted. A desired branch condition status is not available until the beginning of a processing cycle or microcycle for which it is needed. Consequently, the ALU 14 processing path and the barrel shifter 18 processing path, as shown in FIG. 1, are executed simultaneously. At the end of the cycle, the output from one path is selected for storage and a branch is executed based on machine status. The simultaneous execution of the ALU 14 path and the barrel shifter 18 path under microprogram control 30 tends to offset or compensate for the slower speed of operation of a microprogrammed control unit. The dotted box identifying an exponent comparison in an exponent arithmetic unit 66 is included for reference on the microflow chart of FIG. 5 because this is an integral part of a floating point arithmetic operation requiring a microcycle as indicated in Table 1 and known to one skilled in the art.

When a zero or single digit alignment is required during a floating point addition instruction, the alignment and add are performed in one microcycle using the single digit right shifter 12 connected to the ALU 14 path. If a first normalization requires a right shift, then no renormalization is required after rounding. Therefore, fourth microcycle renormalization, as indicated in Table 1, can be achieved using an alignment right shifter 12 connected to the input of ALU 14 and a single digit left shifter 16 connected to the output of ALU 14. The last microcycle of each sequence shown in Table 1 provides for three normalization cases as follows:

1. Normalization shift—single digit right

Right shifter 12 shifts the result right one digit, then the place value of a round digit is added to round the result. No renormalization is required.

2. No normalization shift

Right shifter 12 shifts the result right one digit, then the place value of a round digit displaced one digit to the right is added to round the result. If the result is not now normalized, a single digit left shift is performed by left shifter 16 to put the mantissa in final form.

3. Normalization shift—single digit left

Right shifter 12 passes the result without a shift, then the place value of a round digit displaced one digit to the right is added to round the result. If the result is not now normalized, a single digit left shift is performed by the left shifter 16 to put the mantissa in final form.

In all three cases, an exponent arithmetic unit 66 as shown in FIG. 2 adjusts the exponent part of the floating point number while the mantissa passes through the ALU 14 and left shifter 16. An exponent is merged into a digital word with its mantissa prior to storage of said digital word result.

Referring now to FIG. 3, a detailed logical implementation of the invention of FIG. 1 is shown. In the preferred embodiment, it is a high speed main arithmetic unit 64 for performing mantissa calculation of a thirty-two bit (radix equals 2) floating point digital computer under microprogrammed control 72 as indicated by microprogram control 30 and decoder 31 although the invention is equally applicable to word lengths other than thirty-two bits, other radices and control unit techniques. Some of the control signals 35 are generated as a function of certain machine status conditions 33. Register file 42 comprises 48 words with 32 bits per word; it is a two port file with one port being read-only and the second port being a read/write port and may be embodied with type 29705A register file integrated circuits as manufactured by Advanced Micro Devices, Inc. of Sunnyvale, CA. Floating point mantissa data to be operated on is provided via A Bus 20 and B Bus 22. One output of register file 42 connects to A Bus 20 and the second output connects to B Bus 22. Data may also be placed on the B Bus 22 via the input data 26 line or from the output of C register 36.

In addition to the register file 42, an A register 32, B register 34 and C register 36 are provided as 32 bit working registers for fast intermediate operand storage and may each be embodied with type 54F374 octal D-type flip-flop integrated circuit as manufactured by Fairchild Camera and Instruments Corp. of South Portland, Maine. The A register receives data from the A Bus 20 through buffer 50, or from an F Bus 24. F Bus 24 transfers data from the arithmetic logic units 44 and 14 via buffer 52 and left shifter 16 respectively, or from the barrel shifter 18 or from external sources such as logic for multiply or divide operations. The output of A register 32 connects directly to right shifter 40. The B register 34 input is connected to the B Bus 22 and its output connects directly to right shifter 38. The input to C register 36 is from the F Bus 24 or the A Bus 20 via buffer 50. The C register 36 output connects directly to B Bus 22. C register 36 provides temporary storage and functions in place of the B register 34 during certain microcycles. Implementing a C register 36 proves to be less expensive than providing additional multiplexers at the input to the B register 34 to provide a path from the F Bus 24 to the B register 34, and in addition it saves time.

Still referring to FIG. 3, two arithmetic logic units 14 and 44 are used in parallel primarily to enhance floating point subtraction operations. A Bus 20 and B Bus 22 provide the two operands to both ALU 14 and ALU 44. The output of ALU 14 is connected to left shifter 16 as similarly shown in FIG. 1 and the sign bit connects to the floating point sign logic 48. The output of ALU 44 connects to buffer 52, the output of which is connected to F Bus 24. By these two ALU's being in parallel, one generates a result which is the two's complement of the result of the other one. The ALU with the positive result is selected, thereby avoiding the need to invert a negative two's complement result to sign magnitude which is the form for the floating point mantissa. The signs associated with each operand loaded into the ALU's along with the sign output from ALU 14 are fed into the floating point sign logic 48 which determines the final appropriate sign for the result coming from the ALU operations. The output from the floating point sign logic is transferred to the F Bus 24 via buffer 54. During the performance of a round function, an appropriate constant referred to as a round digit (or bit in the binary system) is provided by literal PROM 46 via the B Bus 22 to ALU 14. ALU 14 and ALU 44 may each be embodied using type 54F181 4 bit arithmetic-logic unit and 54F182 carry look-ahead generator integrated circuits for implementing a thirty-two bit ALU with look-ahead-carry. Each ALU performs logical and arithmetic operations as listed in Table 2 where A and B are the inputs to an ALU. Buffers 50, 52, and 54 may be embodied using type 54F244 actual buffer/line driver integrated circuits. The A Bus and the B Bus may be embodied with type 54F258 quad 2-input multiplexer tristate integrated circuits and the F Bus may be embodied with type 54F244 octal buffer/line driver integrated circuits.

Figure 4:
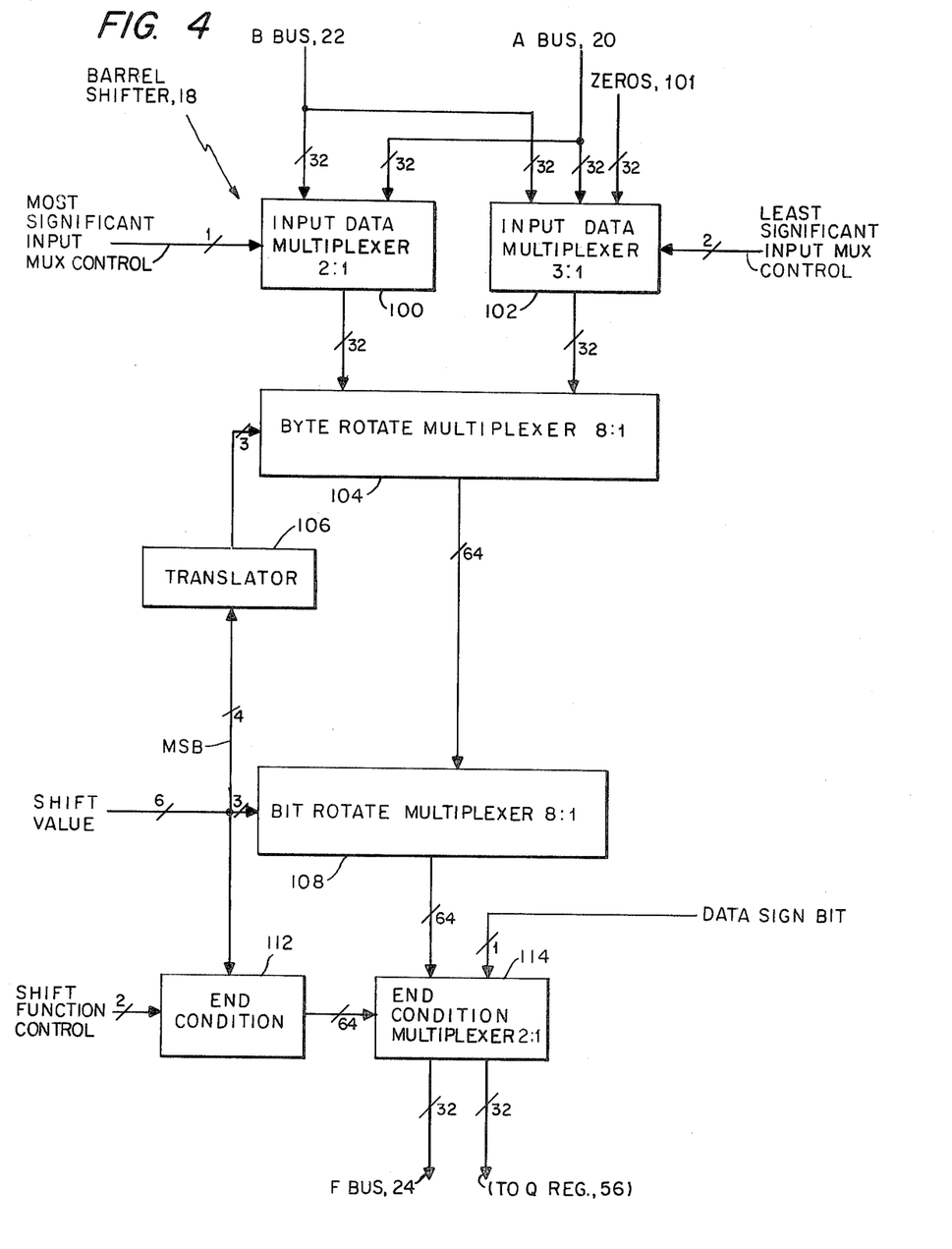
FIG. 4 is a functional block diagram of the barrel shifter 18 depicted in FIG. 1 and FIG. 2.

Referring now to FIG. 4, a multiple bit shifter or barrel shifter 18 is shown which provides one of the two shifter paths, as shown in FIG. 1 and FIG. 3, and provides multiple digit shifting capability. The term barrel shifter refers to a logic aggregate capable of performing right and left shifts of arbitrary length in order to perform alignment or normalization in a single functional traversal of the barrel shifter within a floating point addition instruction operation. The barrel shifter 18 is capable of performing a shift or rotate on 64 bits of binary data and comprises the following four multiplexer stages of logic: input data multiplexers 100 and 102, byte rotate multiplexer 104, bit rotate multiplexer 108 and end condition multiplexer 114.

The input data multiplexers 100 and 102 select either of two 32 bit quantities from A Bus 20 or B Bus 22. The A Bus 20 provides a least significant 32 bit input and the B Bus 22 provides a most significant 32 bit input. In addition, the least significant 32 bits of a data word may be supplied to input data multiplexer 102 as all zeros 101 to accomplish zero insertion when the shift of a 32 bit quantity is desired. A 32 bit rotate is accomplished by selecting the input such that the most significant 32 bits are duplicated as the least significant 32 bits. The output of the input data multiplexers are connected to 8:1 byte rotate multiplexer 104 which positions each 8 bit data byte on a byte boundary during a shift or rotate operation. Translator 106 logic reformats shift values as required to accomplish byte rotates. The outputs of the 8:1 byte rotate multiplexer 104 are connected to the input of 8:1 bit rotate multiplexer 108 which rotates data within an 8 position range to bring the data to a final position. The output of the 8:1 bit rotate multiplexer 108 connects to the 2:1 end condition multiplexer 114 which alter data bit positions as required to accomplish sign extension on zero insertion if a shift (as opposed to a rotate) operation is being executed. The outputs from the end condition multiplexer 114 connect directly to a Q register 56 (shown in FIG. 3) and the F Bus 24.

The input data multiplexers 100 and 102 and the end condition multiplexer 114 may be embodied using type 54F257 quad 2-input multiplexer integrated circuits. The byte rotate multiplexer 104 and the bit rotate multiplexer 108 may be embodied using type 54F151 8-input multiplexer integrated circuits.

The operation of a floating point addition is now considered by referring to FIG. 3, FIG. 5 and Table 1. The micro-program control 30 comprises micro-instructions for performing computer operations such as floating point addition. The period of time for performing a micro-instruction is defined to be a microcycle. The following four microcycles perform a floating point addition:

Microcycle 1: The operand mantissas appear on the A Bus 20 and B Bus 22 either as input data 26 or as data from the register file 42 and they are transferred to the A register 32 and B register 34. Simultaneously, the exponent arithmetic unit 66 as shown in FIG. 2 compares the exponents associated with each mantissa and determines which mantissa requires alignment. The signs of the operands are determined by the floating point sign logic 48 at this time.

Microcycle 2: If an alignment function shift as determined the exponent arithmetic unit 66 exceeds one, then the particular mantissa requiring alignment is routed from A register 32 or B register 34 to the barrel shifter 18 via right shifters 40 or 38 and the A Bus 20 or the B Bus 22, respectively. The least significant bit of the alignment shift count controls the right bit shifter for the selected register contents. The remaining bits of the alignment shift count control the barrel shifter 18. An operand mantissa emerges from barrel shifter 18 aligned and it is stored in the A register 32 if the A register 32 contents were selected for alignment or to the C register 36 if the B register contents were selected for alignment. If the alignment shift count is zero or one then the selected mantissa emerges from its associated right shifter 38 or 40 already aligned; it then passes through the parallel ALU's 14 and 44 where the add function is performed. The result in positive form is stored in the A register 32.

Microcycle 3: If the barrel shifter 18 was used to align the contents of A register 32 then the contents of A register 32 and B register 34 are now added in ALU's 14 and 44 and the result stored in A register 32. If barrel shifter 18 was used to align the contents of B register 34 then the contents of A register 32 and C register 36 are now added in ALU's 14 and 44 and the result stored in A register 32. If the add was completed in microcycle 2, normalization is now performed. If the normalizing shift is one bit or less, then a normalization, round and renormalization is performed using the A register 32, right shifter 40, ALU 14, and left shifter 16 as described hereinbefore in regards to Table 1. A round digit or bit is introduced in the proper position of the ALU input by literal PROM 46 on B Bus 22. The output of left shifter 16 is the mantissa of the result which is stored in register file 42 or it is transferred elsewhere via F Bus 24 together with the sign of the result generated by floating point sign logic 48. If the normalization requires a shift of more than one bit, then the barrel shifter 18 is used to shift the contents of A register 32 and the result is stored back to A register 32.

Microcycle 4: If the barrel shifter 18 was used for a multiple bit alignment, then at most only a one bit normalization is required. The normalization, round and renormalization is executed for the case where the addition was completed in a prior cycle and a multiple bit normalization is not required. If barrel shifter 18 was used for a multiple bit normalization, a round and renormalization is executed on the contents of A register 32 using ALU 14, left shifter 16, and literal PROM 46. This amounts to the normalization, round and renormalization case wherein the result is normalized at the time the microcycle begins.

This concludes the description of the preferred embodiment. However, many modifications and alterations will be obvious to one of ordinary skill in the art without departing from the spirit and scope of the inventive concept. For example, a multiple digit shifter or barrel shifter may be implemented by a logic design other than the one disclosed herein for accomplishing the identical function. Therefore, it is intended that the scope of this invention be limited only by the appended claims.

TABLE 1

| FLOATING POINT ADDITION SEQUENCES | |
|---|---|
| Sequence | Microcycle Operations |
| A | 1. Exponent compare and load input data |
|  | 2. Align in barrel shifter |
|  | 3. Add |
|  | 4. Normalize, round, renormalize and store result |
| B | 1. Exponent compare and load input data |
|  | 2. Zero or one digit align and add |

TABLE 1-continued
FLOATING POINT ADDITION SEQUENCES

| Sequence | Microcycle Operations |
|---|---|
| | 3. Normalize in barrel shifter |
| | 4. Round, renormalize and store result |
| C | 1. Exponent compare and load input data |
| | 2. Zero or one digit align and add |
| | 3. Normalize, round, renormalize and store result |

TABLE 2
ALU FUNCTIONS

| Logical | Arithmetic |
|---|---|
| Not A | A |
| Not (A and B) | A and B |
| Not A or B | A and Not B |
| One | Zero |
| Not (A or B) | A Plus (A or Not B) |
| Not B | (A and B) Plus (A or Not B) |
| A Exclusive Nor B | A Minus B |
| A or Not B | A or Not B |
| Not A and B | A Plus (A or B) |
| A Exclusive or B | A Plus B |
| B | (A and Not B) Plus (A or B) |
| A or B | A or B |
| Zero | A + A |
| A and Not B | (A and B) Plus A |
| A and B | (A and Not B) Plus A |
| A | A |

What is claimed is:

1. In combination:
shifter means for performing a floating pooint addition operation comprising alignment and normalization functions wherein a digital word passes through said shifter means only once to accomplish each of said functions;
said shifter means including a single digit shifter means for shifting digits within said digital word one place during said operation;
said shifter means further including a multiple digit shifter means coupled to said single digit shifter means for shifting digits within said digital word a plurality of places, said multiple digit shifter means being traversed by said digital word no more than one time during said floating point addition operation; and
arithmetic means for performing an add function during said floating point addition operation, said arithmetic means being coupled to said shifter means whereby said digital word is not required to pass through said arithmetic means solely to gain access to said multiple digit shifter means.

2. The combination as recited in claim 1 wherein:
said shifter means performs left and right shifts of digits within said digital word.

3. The combination as recited in claim 1 wherein:
said arithmetic means performs said add function on two mantissa digital words during said floating point addition operation.

4. The combination as recited in claim 1 wherein:
said multiple digit shifter means comprises a barrel shifter.

5. The combination as recited in claim 1 including:
a microprogram control means for generating control signals.

6. The combination as recited in claim 5 wherein:
said microprogram control means having said control signals coupled to said shifter means and said arithmetic means, simultaneously enables parallel paths comprising said multiple digit shifter means and said arithmetic means, said control means selecting for storage the outputs from only one of said paths as determined by machine status conditions.

7. In combination:
shifter means for performing a floating point addition operation including alignment and normalization functions wherein a digital word passes through said shifter means only once to accomplish each of said functions;
said shifter means comprising a single digit right shifter;
arithmetic means coupled to the output of said right shifter for performing an add function during said floating point addition operation;
said shifter means further comprising a single digit left shifter coupled to the output of said arithmetic means, said arithmetic means being traversed by a digital word only for performing an arithmetic function and not solely for said digital word to gain access to said shifter means; and
said shifter means further comprising, a right shifter coupled in series with said arithmetic means and a multiple digit shifter, said multiple digit shifter being coupled in parallel with said arithmetic means and said left shifter, said multiple digit shifter traversed by said digital word no more than once during the execution of said floating point addition operation.

8. The combination as recited in claim 7 wherein:
said single digit right shifter comprises means for performing a single digit right shift or no digit shift.

9. The combination as recited in claim 7 wherein:
said single digit left shifter comprises means for performing a single digit left shift or no digit shift.

10. The combination as recited in claim 7 wherein:
said multiple digit shifter comprises means for shifting digits of said digital word a plurality of places left or right.

11. The combination as recited in claim 7 wherein:
said multiple digit shifter performs said alignment or said normalization function but not both during said floating point addition operation.

12. The combination as recited in claim 7 wherein:
said arithmetic means performs said add function on two mantissa digital words during said floating point addition operation.

13. The combination as recited in claim 7 wherein:
said arithmetic means comprises an arithmetic-logic unit for performing said add function.

14. The combination as recited in claim 7 wherein:
said arithmetic means further comprises means for determining the sign of a digital word resulting from said floating point addition operation.

15. The combination as recited in claim 7 wherein:
said multiple digit shifter comprises a barrel shifter.

16. The combination as recited in claim 7 including:
a microprogram control means for generating control signals.

17. The combination as recited in claim 16 wherein:
said microprogram control means having said control signals coupled to said shifter means and said arithmetic means, simultaneously enables parallel paths comprising said multiple digit shifter and said arithmetic means, said control means selecting for storage the output from only one of said paths as determined by machine status conditions.

18. In combination:

shifter means for performing a floating point addition operation including alignment and normalization functions wherein a digital word passes through said shifter means only once to accomplish each of said functions;

said shifter means comprising a single digit right shifter;

arithmetic means coupled to the output of said right shifter for performing an add function during said floating point addition operation;

said shifter means further comprising a single digit left shifter coupled to the output of said arithmetic means, said arithmetic means being traversed by a digital word only for performing an arithmetic function and not solely for said digital word to gain access to said shifter means;

said shifter means further comprising, a right shifter coupled in series with said arithmetic means and a multiple digit shifter, said multiple digit shifter being coupled in parallel with said arithmetic means and said left shifter, said multiple digit shifter traversed by said digital word no more than once during the execution of said floating point addition operation;

means for providing a first digital word to said arithmetic means representing one of two digital words to be added together; and means for providing a second digital word to said arithmetic means representing a second of two digital words to be added together.

19. The combination as recited in claim 18 wherein:
said single digit right shifter comprises means for performing a single digit right shift or no digit shift.

20. The combination as recited in claim 18 wherein:
said single digit left shifter comprises means for performing a single digit left shift or no digit shift.

21. The combination as recited in claim 18 wherein:
said multiple digit shifter comprises means for shifting digits of a digital word a plurality of places left and right.

22. The combination as recited in claim 18 wherein:
said multiple digit shifter performs said alignment or said normalization function but not both during said floating point addition operation.

23. The combination as recited in claim 18 wherein:
said arithmetic means performs said add function on two mantissa digital words during said floating point addition operation.

24. The combination as recited in claim 18 wherein:
said arithmetic means comprises an arithmetic-logic unit for performing said add function.

25. The combination as recited in claim 18 wherein:
said arithmetic means further comprises means for determining the sign of a digital word resulting from said floating point addition operation.

26. The combination as recited in claim 18 wherein:
said multiple digit shifter comprises a barrel shifter.

27. The combination as recited in claim 18 including:
a microprogram control means for generating control signals.

28. The combination as recited in claim 27 wherein:
said microprogram control means having said control signals coupled to said shifter means and said arithmetic means simultaneously enables parallel paths comprising said multiple digit shifter and said arithmetic means, said control means selecting for storage the output from only one of said paths as determined by machine status conditions.

29. In combination:
shifter means for performing a floating point addition operation including alignment and normalization functions wherein a digital word passes through said shifter means only once to accomplish each of said functions;

said shifter means comprising a single bit right shifter;

arithmetic means coupled to the output of said right shifter for performing an add function during said floating point addition operation;

said shifter means further comprising a single bit left shifter coupled to the output of said arithmetic means, said arithmetic means being traversed by a digital word only for performing an arithmetic function and not solely for said digital word to gain access to said shifter means;

said shifter means further comprising, said right shifter coupled in series with said arithmetic means and a multiple bit shifter, said multiple bit shifter being coupled in parallel with said arithmetic means and said left shifter, said multiple bit shifter traversed by said digital word no more than once during the execution of said floating point addition operation;

means for providing a first digital word to said arithmetic means representing one of two digital words to be added together; and means for providing a second digital word to said arithmetic means representing a second of two digital words to be added together.

30. The combination as recited in claim 29 wherein:
said single bit right shifter comprises means for performing a single bit right shift or no bit shift.

31. The combination as recited in claim 29 wherein:
said single bit left shifter comprises means for performing a single bit left shift or no bit shift.

32. The combination as recited in claim 29 wherein:
said multiple bit shifter comprises means for shifting bits of a digital word a plurality of places left or right.

33. The combination as recited in claim 29 wherein:
said multiple bit shifter performs said alignment or said normalization function but not both during said floating point addition operation.

34. The combination as recited in claim 29 wherein:
said arithmetic means performs said add function on two mantissa digital words during said floating point addition operation.

35. The combination as recited in claim 29 wherein:
said arithmetic means comprises an arithmetic-logic unit for performing said add function.

36. The combination as recited in claim 29 wherein:
said arithmetic means further comprises means for determining the sign of a digital word resulting from said floating point addition operation.

37. The combination as recited in claim 29 wherein:
said multiple bit shifter comprises a barrel shifter.

38. The combination as recited in claim 29 including:
a microprogram control means for generating control signals.

39. The combination as recited in claim 38 wherein:
said microprogram control means simultaneously enables parallel paths comprising said multiple bit shifter and said arithmetic means, said control means selecting for storage the output from only one of said paths as determined by machine status conditions.

40. A digital computer comprising:

memory means for storing digital words including data and instructions;

arithmetic means for performing arithmetic and logic functions, said arithmetic means including a main arithmetic unit and an exponent arithmetic unit;

input-output means for controlling the passage of digital words in and out of said computer;

control means coupled to said memory means, said arithmetic means and said input-output means for generating signals to perform computer operations;

bus means for interconnecting said memory means, said arithmetic means and said input-output means;

said main arithmetic unit including shifter means for performing a floating point addition operation comprising alignment and normalization functions wherein a digital word passes through said shifter means only once to accomplish each of said functions;

said shifter means including a single digit shifter means for shifting digits within said digital word one place during said operations;

said shifter means further including a multiple digit shifter means coupled to said single digit shifter means for shifting digits within said digital word a plurality of places, said multiple digit shifter means being traversed by said digital word no more than one time during said floating point addition operation; and said main arithmetic unit further including an arithmetic logic unit coupled to said shifter means for performing an add function whereby said digital word is not required to pass through said arithmetic-logic unit solely to gain access to said shifter means.

41. The combination as recited in claim 40 wherein:
said input-output means comprises an input-output bus for transferring digital words to and from said computer.

42. The combination as recited in claim 40 wherein:
said shifter means performs left and right shifts of digits within said digital word.

43. The combination as recited in claim 40 wherein:
said arithmetic-logic unit performs said add function on two mantissa digital words during said floating point addition operation.

44. The combination as recited in claim 40 wherein:
said multiple digit shifter means comprises a barrel shifter.

45. The combination as recited in claim 40 wherein:
said control means comprises a microprogram control means for generating said signals.

46. The combination as recited in claim 45 wherein:
said microprogram control means, having said control signals coupled to said shifter means and said arithmetic means, simultaneously enables parallel paths comprising said multiple digit shifter means and said arithmetic logic unit, said control means selecting for storage the outputs from only one of said paths as determined by machine status conditions.

47. A digital computer comprising:
memory means for storing digital words including data and instructions;

arithmetic means for performing arithmetic and logic functions, said arithmetic means including a main arithmetic unit and an exponent arithmetic unit;

input-output means for controlling the passage of digital words in and out of said computer;

control means coupled to said memory means, said arithmetic means and said input-output means for generating signals to perform computer operations;

bus means for interconnecting said memory means, said arithmetic means and said input-output means;

said main arithmetic unit including shifter means for performing a floating point addition operation comprising alignment and normalization functions wherein a digital word passes through said shifter means only once to accomplish each of said functions;

said shifter means comprising a single digit right shifter;

said main arithmetic unit further including an arithmetic-logic unit coupled to the output of said right shifter for performing an add function;

said shifter means further comprising a single digit left shifter coupled to the output of said arithmetic logic unit, said arithmetic-logic unit being traversed by a digital word only for performing an arithmetic function and not solely for said digital word to gain access to said shifter means; and said shifter means further comprising, a right shifter coupled in series with said arithmetic means and a multiple digit shifter, said multiple digit shifter being coupled in parallel with said arithmetic means and said left shifter, said multiple digit shifter being traversed by said digital word no more than once during the execution of said floating point addition operation.

48. The combination as recited in claim 47 wherein:
said input-output means comprises an input-output bus for transferring digital words to and from said computer.

49. The combination as recited in claim 47 wherein:
said single digit right shifter comprises means for performing a single digit right shift or no digit shift.

50. The combination as recited in claim 47 wherein:
said single digit left shifter comprises means for performing a single digit left shift or no digit shift.

51. The combination as recited in claim 47 wherein:
said multiple digit shifter comprises means for shifting digits of a digital word a plurality of places left and right.

52. The combination as recited in claim 47 wherein:
said multiple digit shifter performs said alignment or said normalization function but not both during said floating point addition operation.

53. The combination as recited in claim 47 wherein:
said arithmetic logic unit performs said add function on two mantissa digital words during said floating point addition operation.

54. The combination as recited in claim 47 wherein:
said arithmetic means further comprises means for determining the sign of a digital word resulting from said floating point addition operation.

55. The combination as recited in claim 47 wherein:
said multiple digit shifter comprises a barrel shifter.

56. The combination as recited in claim 47 wherein:
said control means comprises a microprogram control means for generating said signals.

57. The combination as recited in claim 56 wherein:
said microprogram control means simultaneously enables parallel paths comprising said multiple digit shifter and said arithmetic means, said control means selecting for storage the output from only one of said paths as determined by machine status conditions.

58. The method of performing a floating point addition operation on a first and a second mantissa digital words comprising the steps of:

performing an alignment function by passing either of said first and second digital words through a shifter means only once to accomplish said function, said shifter means comprising a single digit shifter means and a multiple digit shifter means;

performing an addition function by passing said first and said second mantissa digital words after said alignment function through an arithmetic means coupled to said single digit shifter means and said multiple digit shifter means whereby a digital word is not required to pass through said arithmetic means solely to gain access to said shifter means;

performing a first normalization function by passing a third digital word resulting from said addition function through said shifter means only once to accomplish said first normalization function, said shifter means comprising said single digit shifter means and said multiple digit shifter means, said multiple digit shifter means being utilized only once for multiple digit shifts during either said alignment function or said first normalization function during said floating point addition operation;

performing a round function by passing a fourth digital word resulting from said first normalization function through said arithmetic means; and performing a second normalization function by passing a fifth digital word resulting from said round function through said shifter means only once to accomplish said function, said shifter means comprising said single digit shifter means.

59. The method as recited in claim 58 wherein:
said steps utilizing said shifting means includes performing left and right shifts.

60. The method as recited in claim 58 wherein:
said steps utilizing said multiple digit shifter means comprises the use of a barrel shifter.

61. The method as recited in claim 58 wherein:
said steps of performing said alignment function, said first normalization function and said second normalization function include using said single digit shifter means having a digit shift mode and a no digit shift mode.

62. The method as recited in claim 58 wherein:
each step of said method includes generating control signals using microprogram control means.

63. The method as recited in claim 62 wherein:
said control signals generated using said microprogram control means simultaneously enable parallel paths comprising said multiple digit shifter means in one parallel path and said arithmetic means in another parallel path, said control means selecting for storage the output from only one of said paths as determined by status conditions of said floating point addition operation.

* * * * *